(12) United States Patent
Kadambi et al.

(10) Patent No.: US 9,451,141 B2
(45) Date of Patent: Sep. 20, 2016

(54) METHODS AND APPARATUS FOR DEMULTIPLEXING ILLUMINATION

(71) Applicants: Achuta Kadambi, Cambridge, MA (US); Ayush Bhandari, Cambridge, MA (US); Ramesh Raskar, Cambridge, MA (US)

(72) Inventors: Achuta Kadambi, Cambridge, MA (US); Ayush Bhandari, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 40 days.

(21) Appl. No.: 14/690,159

(22) Filed: Apr. 17, 2015

(65) Prior Publication Data
US 2015/0304534 A1    Oct. 22, 2015

Related U.S. Application Data

(60) Provisional application No. 61/981,787, filed on Apr. 19, 2014.

(51) Int. Cl.
*H04N 5/225* (2006.01)
*H04N 5/222* (2006.01)
*G01S 17/89* (2006.01)
*G01S 7/481* (2006.01)

(52) U.S. Cl.
CPC ........... *H04N 5/2256* (2013.01); *G01S 7/4815* (2013.01); *G01S 17/89* (2013.01); *H04N 5/2226* (2013.01); *G06T 2207/10028* (2013.01)

(58) Field of Classification Search
None
See application file for complete search history.

(56) References Cited

PUBLICATIONS

Castaneda, V., et al., 2011, Stereo time-of-flight. 2011 IEEE International Conference on Computer Vision (ICCV), Nov. 2011, pp. 1684-1691.
Chan, T., et al., 2012, Towards optimal design of time and color multiplexing codes. Proceedings of the 12th European conference on Computer Vision, ECCV'12, vol. Part VI, pp. 485-498, Springer-Verlag Berlin, Heidelberg 2012.
De Decker, B., et al., 2009, Capturing multiple illumination conditions using time and color multiplexing. 2009 IEEE Conference on Computer Vision and Pattern Recognition, CVPR 2009, Jun. 2009, pp. 2536-2543.
Gu, J., et al., 2011, Multiplexed illumination for scene recovery in the presence of global illumination. 2011 IEEE International Conference on Computer Vision (ICCV), Nov. 2011, pp. 691-698.

(Continued)

*Primary Examiner* — Roberto Velez
*Assistant Examiner* — Stephen Coleman
(74) *Attorney, Agent, or Firm* — Stephen R. Otis

(57) ABSTRACT

In illustrative implementations of this invention, an imaging system includes multiple light sources that illuminate a scene, and also includes a lock-in time of flight camera. While the scene is illuminated by these light sources, each of the light sources is amplitude-modulated by a different modulation pattern, and a reference signal is applied to the lock-in time-of-flight camera. The modulation patterns and the reference signal are carefully chosen such that the imaging system is able to disentangle, in real time, the respective contributions of the different light sources, and to compute, in real-time, depth of the scene. In some cases, the modulation signals for the light sources are orthogonal to each other and the reference signal is broadband. In some cases, the modulation codes for the light sources and the reference code are optimal codes that are determined by an optimization algorithm.

20 Claims, 9 Drawing Sheets

(56) References Cited

PUBLICATIONS

Kadambi, A., et al., 2013, Coded time of flight cameras: sparse deconvolution to address multipath interference and recover time profiles. ACM Transactions on Graphics (TOG)—Proceedings of ACM SIGGRAPH Asia 2013, vol. 32 Issue 6, Nov. 2013, Article No. 167, ACM New York, NY, USA.

Kim, S., et al., 2012, A 1920x×1080 3.65 μm-Pixel 2D/3D Image Sensor With Split and Binning Pixel Structure in 0.11 μm Standard CMOS. 2012 IEEE International Solid-State Circuits Conference.

Muttayane, A., 2006, Towards Colour Imaging with the Image Ranger. Masters Thesis, The University of Waikato, 2006.

Nayar, S., et al., Fast separation of direct and global components of a scene using high frequency illumination. Acm Transactions on Graphics (TOG)—Proceedings of ACM SIGGRAPH 2006, vol. 25, Issue 3, Jul. 2006, pp. 935-944, ACM New York, NY, USA.

Park, J., et al., 2007, Multispectral Imaging Using Multiplexed Illumination. IEEE 11th International Conference on Computer Vision, 2007, ICCV 2007, Oct. 2007, pp. 1-8.

Ratner, N., et al., 2007, Optimal multiplexed sensing: bounds, conditions and a graph theory link. Optics Express vol. 15, Issue 25, pp. 17072-17092 (2007).

Ratner, N., et al., 2007, Illumination Multiplexing within Fundamental Limits. IEEE Conference on Computer Vision and Pattern Recognition, 2007, ICVPR '07, Jun. 2007, pp. 1-8.

Schechner, Y., et al., 2007, Multiplexing for Optimal Lighting. IEEE Transactions on Pattern Analysis and Machine Intelligence, vol. 29, Issue 8, Aug. 2007, pp. 1339-1354, IEEE Computer Society Washington, DC, USA.

METHODS AND APPARATUS FOR DEMULTIPLEXING ILLUMINATION

RELATED APPLICATIONS

This application is a non-provisional of, and claims the benefit of the filing date of, U.S. Provisional Patent Application No. 61/981,787, filed Apr. 19, 2014, the entire disclosure of which is herein incorporated by reference.

FIELD OF TECHNOLOGY

The present invention relates generally to demultiplexing illumination from multiple illumination sources.

SUMMARY

In illustrative implementations, the light signals emitted by multiple light sources and a reference signal for a lock-in time of flight camera are carefully chosen, such that, for each pixel of the camera, the separate contribution of each of the light sources, respectively, is extracted in real time in post-processing.

This is unlike a conventional ToF technique, in which (a) square waves are used for the illumination strobing, and (b) the contributions of multiple light sources cannot be separately extracted.

In illustrative implementations of this invention, an imaging system includes multiple light sources that illuminate a scene, and also includes a lock-in time-of-flight camera. While the scene is illuminated by these light sources: (a) each of the light sources is amplitude-modulated (strobed) by a different modulation pattern, and (b) a reference signal is applied to the lock-in time-of-flight (ToF) camera.

The modulation patterns and the reference signal are carefully chosen such that the imaging system is able: (a) to disentangle, in real time, the respective contributions of the different light sources, and (b) to compute, in real-time, depth of the scene.

The light incident on the lock-in ToF camera is reflected from the scene and is a combination of the light contributed by the different light sources. The imaging system measures the combined light and determines a separate image for each light source. Each separate image shows the scene as illuminated by only one of the light sources, respectively. Thus, the imaging system computationally relights the scene.

For example, in some implementations of this invention, a red (R) light source, a green (G) light source and a blue (B) light source illuminate the scene. The modulation patterns for the light sources and the reference signal for the lock-in ToF camera are chosen so that the imaging system disentangles the combined RGB light into separate images. Each of the separate images corresponds to the scene as lit by only one of the light sources.

In this example with red, green and blue light sources, a computer analyzes data gathered by each pixel in the lock-in ToF camera, respectively, and calculates for that pixel: (a) the intensity of light incident on the pixel due to the red light source; (b) the intensity of light incident on the pixel due to the green light source; (c) the intensity of light incident on the pixel due to the blue light source, and (d) the depth of a scene point that reflects light to the pixel. In this example, each pixel gathers RGBD information.

In this example, the computer uses this data from all of the pixels to calculate both (a) a depth map of the entire scene and (b) a separate image of the scene for each light source, that is, an image of the scene as lit only by the red light source, an image of the scene as lit only by the green light source, and an image of the scene as lit only by the blue light source. In some cases, a computer combines the depth map and separate red, green and blue images into a single, colored RGBD depth map.

As used herein, "pixel" means the smallest unit of a camera that measures light incident on the unit. For example, under this definition, three photodiodes covered by a red filter, green filter and blue filter, respectively, are three pixels. In a camera that uses photodiodes to measure incident light, each pixel includes one, but not more than one, photodiode.

In illustrative implementations of the invention, each pixel of the camera includes one, but not more than one, photodiode. A computer calculates the separate contribution of each light source, respectively, to the light incident on the photodiode.

In illustrative implementations of this invention, an ordinary lock-in time-of-flight (ToF) camera is employed. Conventionally, of course, a lock-in ToF camera does not gather data from which the contributions of separate light sources can be disentangled.

However, in illustrative implementations of this invention, the modulation patterns for the light sources and reference signal for the ToF camera are carefully chosen so that the contributions of the separate light sources may be disentangled—that is, extracted from the combined light reflected from all of the light sources. This enables a computer to calculate, for each of the light sources, an image of the scene as lit only by that light source.

In some implementations of this invention, the signals are chosen as follows: (a) the modulation signals for the light sources are orthogonal to each other and (b) the reference signal is a broadband signal with respect to the sampling rate of the camera. For example, in some cases, the light source modulation signals comprise harmonic sinusoids and the reference signal is broadband with respect to the sampling rate of the camera. (Harmonic sine waves are orthogonal to each other). In some cases, the light source modulation signals sources are orthogonal to each other and the reference signal comprises an m-sequence. (An m-sequence is an example of a broadband pattern).

Alternatively, in some implementations, a computer calculates a reference code and the light modulation codes by performing an optimization algorithm. For example, in some cases the optimization algorithm comprises a semi-definite optimization problem, and a computer solves this problem by performing non-negative matrix factorization (NMF).

Alternatively: (a) less than four light sources are used, each strobed at a different frequency; and (b) a computer calculates the reference code and the light modulation codes such that the energy of the reference signal is predominantly located in narrow frequency bands that match the strobing frequencies of the light sources, respectively. For example, in some cases. (a) only two light sources are used, each strobed at a different frequency; and (b) the energy of the reference signal is predominantly located in two narrow frequency bands that match the strobing frequencies of the two light sources.

In illustrative implementations, a signal generator (e.g., field programmable gate array) generates the reference signal and modulation signals. The reference signal and modulation signals are each a digital electrical voltage signal. The modulation signals control amplitude modulation of light emitted by the different light sources, respectively. Each modulation signal controls amplitude modulation of one of the light sources.

In illustrative implementations, the reference signal is applied to each pixel of the ToF camera. Each pixel of the ToF camera calculates a cross-correlation of the reference signal and measured light intensity at the pixel.

As used herein, a "raw frame" of a camera means the smallest period of time during which the camera takes measurements of light and the measurements are converted into digital electronic data.

In illustrative implementations of this invention, each light source is strobed repeatedly during each raw frame of the ToF camera. Due to the strobing, the intensity of each light source varies periodically during each raw frame. For example, in many implementations of this invention, each raw frame is in the millisecond range, and the strobing is in the nanosecond range. For example, in a prototype of this invention, each raw frame of the ToF camera (including exposure and readout) is approximately 2 milliseconds, and for each light source, tens or hundreds of strobing periods of the light source occur during each raw frame.

In illustrative implementations, the strobing frequency is different for each of the light sources. The different light sources are strobed simultaneously but at different strobing frequencies. Thus, the strobing of the different light sources overlap in time. (This is in contrast to conventional time-multiplexing, in which different lights are never on at the same time).

In illustrative implementations of this invention, the superposition of the simultaneous multiple strobing patterns forms a combined illumination that illuminates the scene.

Multiple light sources are used. However, only a single reference code is used for all of the pixels in the ToF camera. The energy of the reference signal is non-zero in frequency bands that match the strobing frequencies of the light sources, respectively.

In illustrative implementations, multispectral illumination is used, that is, the different light sources have different spectrums. For example, in some cases, the light sources are red, green, and blue, respectively, or each light source emits light in a different frequency band in the visible or near-infrared range. Using multispectral illumination is often advantageous, because different information is obtained by illuminating a surface under different wavelengths of light. Alternatively, the light sources all have the same spectrum.

In illustrative implementations, this invention has at least seven advantages:

First, each pixel of the camera gathers data from which the contributions of different light sources may be extracted, and from which depth of a corresponding scene point may be determined. Thus, in some cases where there are RBG light sources, each pixel of the camera functions as an RBGD pixel. In many cases, each pixel of the camera includes one, but not more than one, photodiode and each photodiode functions as an RBDG sensor. This avoids the problems of a conventional approach (such as the second generation of Microsoft® Kinect®) in which a depth camera is positioned next to a conventional video camera, and in which the parallax (difference in viewing angle of the depth camera and video camera) causes artifacts. In illustrative implementations of this invention, there is no parallax between an image sensor and a depth sensor, because the image sensor and depth sensor are one and the same.

Second, in illustrative implementations, this invention does not sacrifice spatial resolution in order to de-multiplex different light sources. Each single pixel gathers both data from which the contributions of different light sources may be extracted and from which depth may be determined. This compares favorably to an existing approach in which separate R, B, G and D pixels are positioned in a single sensor, thereby reducing spatial resolutions by a factor of 4.

Third, in illustrative implementations, using a single camera avoids the need to register the two cameras or synchronize their framerates.

Fourth, in illustrative implementations, the images ignore ambient light. This is desirable for machine vision applications, where ambient shadows are a known challenge.

Fifth, using multiple illumination sources allows depth maps to be statistically corrected.

Sixth, in illustrative implementations, the imaging system computationally relights a scene, and allows a user to "shoot now, relight later".

Seventh, in illustrative implementations, the imaging system operates in real time. That is, the imaging system provides depth information in real time and demultiplexes the light sources (e.g., calculates separate images, each of which is lit by only one of the light sources) in real time. This real-time operation has been demonstrated in a working prototype.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a field of technology to which exemplary implementations of this invention generally relate. Likewise, the Title of this document does not limit the invention in any way; instead the Title is merely a general, non-exclusive way of referring to this invention. This invention may be implemented in many other ways.

The above Figures show illustrative implementations of this invention, or provide information that relates to those implementations. However, this invention may be implemented in many other ways.

DETAILED DESCRIPTION

In illustrative implementations, the light signals emitted by multiple light sources and a reference signal applied to the sensor of a lock-in ToF camera are carefully chosen, such that, for each pixel of the camera, the separate contribution of each of the light sources, respectively, is extracted in real time in post-processing.

This is unlike a conventional ToF technique, in which (a) square waves are used for the illumination strobing, and (b) the contributions of multiple light sources cannot be separately extracted.

Figure 1:
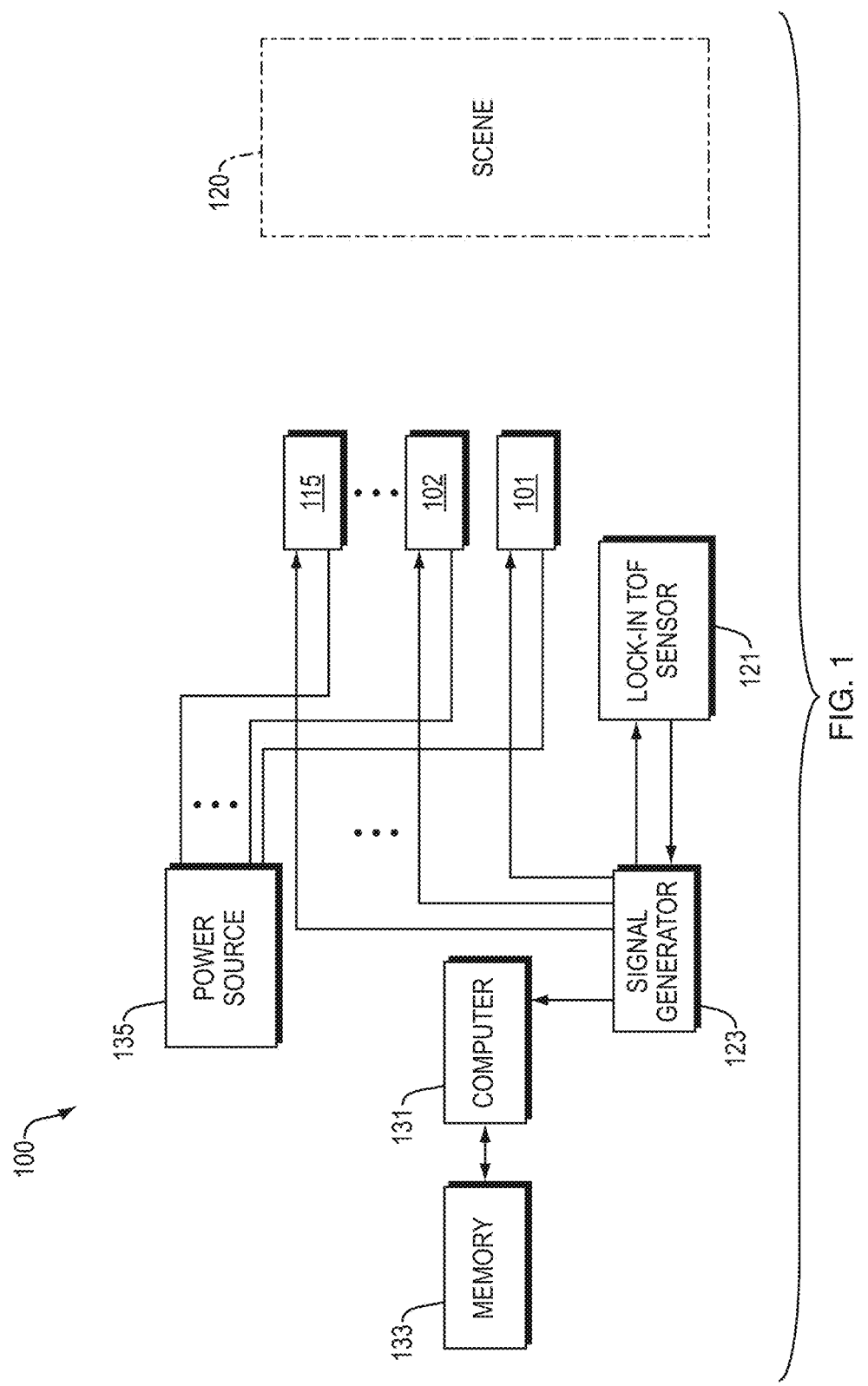
FIG. 1 is a diagram that shows hardware components of an imaging system.

FIG. 1 is a diagram that shows hardware components of an imaging system, in an illustrative implementation of this invention. In FIG. 1, the imaging system 100 includes a set of n light sources (e.g., 101, 102, . . . , 115), where n≥2. For example, in some cases, the light sources comprise solid-state lighting devices, such as light-emitting diodes (LEDs), organic light-emitting diodes (OLEDs) or polymer light-emitting diodes (PLEDs). Alternatively, in some cases, the light sources comprise laser diodes or other coherent light sources. The light sources strobe at a high frequency (e.g., in the megahertz range).

A signal generator 123 generates n modulation signals for controlling amplitude modulation of the n light sources. Thus, the amplitude of light emitted by each of the n light sources is separately modulated. In some cases, the signal generator 123 comprises a field programmable gate array (FPGA).

The signal generator 123 also generates a reference signal. In some cases, the signal generator includes a phase-lock loop (PLL) for synchronizing the modulation signals and the reference signal, such that the signals start at the same time or such that certain features in the signals occur simultaneously.

In illustrative implementations, the modulation signals that modulate the light sources and the reference signal are each a digital electrical signal. Alternatively, the modulation signals or reference signals comprise analog electrical signals that are converted by an ADC (analog-to-digital converter) to digital signals, before being applied to the light sources (e.g., 101, 102, . . . , 115) or lock-in ToF camera 121.

The light sources illuminate a scene 120. Light reflects from the scene 120 to a lock-in time-of-flight camera 121. The lock-in ToF camera 121 measures, at the pixel level, a cross-correlation between measured incident light and the reference signal. In illustrative implementations: (a) each pixel of the lock-in ToF camera 121 includes one, but not more than one, photodiode; and (b) each pixel in the lock-in ToF camera 121 outputs a signal indicative of a cross-correlation of (i) the reference signal and (ii) incident light intensity measured by the photodiode. One or more power sources 135 provide electrical power to the lock-in ToF camera 121 and the light sources (e.g., 101, 102, . . . , 115). In some cases, the power source 135 is a DC voltage source.

Data (including pixelwise cross-correlation data) from the lock-in ToF camera 123 is transmitted to the signal generator 123 and then to a computer 131. Alternatively, this data is transmitted directly to the computer 131 (i.e., is not transmitted via the signal generator 123).

The computer 131 performs an algorithm that takes data from the lock-in ToF camera 123 as input and (a) determines scene depth and (b) demultiplexes the multiple illumination sources. For each pixel of the lock-in ToF camera 121, this algorithm calculates (a) intensity of light incident on the pixel due to each of n light sources, respectively, and (b) the depth of a scene point that reflects light to the pixel. The algorithm combines this information to calculate: (a) multiple images of the scene, each image showing the scene as illuminated by only one of the light sources, respectively; and (b) a depth map of the scene. In some cases, the algorithm combines the depth map and the separate images for the different light sources, to form a single combined image that indicates depth. For example, in some cases, the light sources comprise a red, green and blue light source, respectively, and the algorithm calculates a RGBD depth map.

The computer reads data from, and writes data into, one or more electronic memory devices 133. For example, in some cases, memory device 133 stores data indicative of (a) modulation signals, (b) reference signals, (c) camera measurements, (d) demultiplexed images, each of which is lit only by one light source, or (e) a depth map.

In a prototype of this invention, the lock-in ToF camera includes a PMD™ 19k-3 sensor which has an array size of 120 by 160 pixels. The sensor interfaces to a Cyclone® IV E FPGA. The FPGA generates the modulation signals for the light sources and the reference signal for the lock-in ToF sensor. The FPGA also controls the integration period, the readout timing and the UDP (user datagram protocol) interface to the host computer. The pixel values are converted to 16 bit unsigned values by an Analog Devices AD9826 ADC. The prototype is a non-limiting example of this invention. This invention may be implemented in many other ways.

Figure 2:
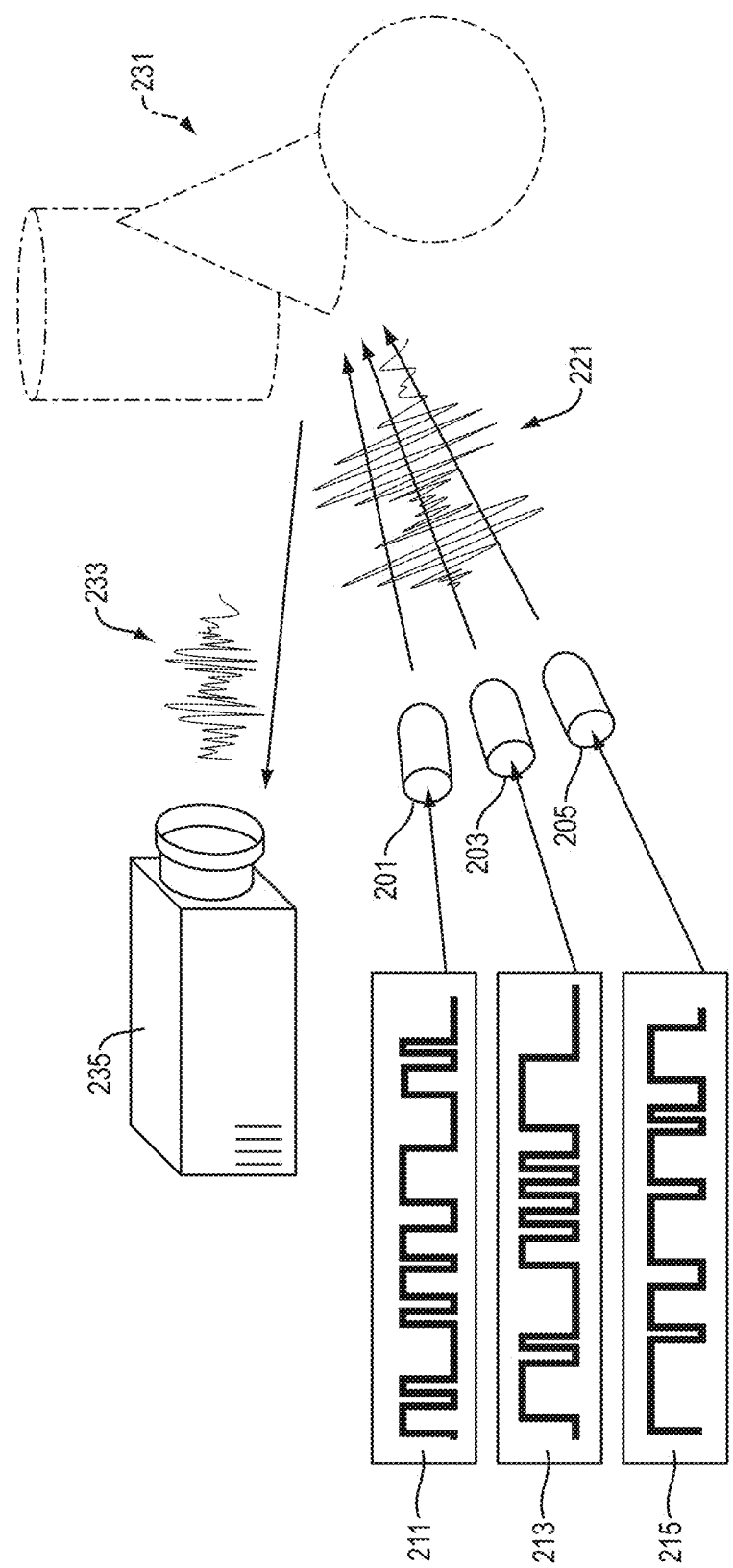
FIG. 2 is a conceptual diagram in which multiple light sources are modulated with different modulation signals.

FIG. 2 is a conceptual diagram in which multiple light sources are modulated with different modulation patterns, in an illustrative implementation of this invention. In FIG. 2, a red light source 201, green light source 203 and blue light source 205 simultaneously emit light. The light emitted by these light sources is amplitude modulated (strobed) such that the intensity of light emitted by each of these light sources varies over time during each raw frame. In illustrative implementations, each of these lights is amplitude modulated in a periodic modulation pattern that repeats many times per raw frame (e.g., tens, hundreds or thousands of modulation periods per raw frame).

In FIG. 2, waveforms 211, 213, 215 symbolize a portion of three different modulation signals. These modulation signals are electrical voltage signals that are generated by a signal generator and that control the strobing of the light sources 201, 203, 205. That is, the modulation signals control the amplitude modulation of the light sources (the modulation of the intensity of light emitted by the light sources). Different modulation signals are applied to the different light sources, such that each light source is controlled by a unique modulation signal.

In some implementations, the modulation signals are orthogonal to each other. That is, the dot product of each pair of the modulation signals is zero. Alternatively, in some cases, a computer calculates the modulation signals by performing an optimization algorithm, as described in more detail below. Alternatively, in some cases, a computer 131 retrieves stored modulation codes from a memory device 133.

In FIG. 2, waveforms 211, 213, 215 symbolize any type or shape of waveform. For example, in some cases, waveforms 211, 213, 215 symbolize harmonic sinusoids.

The combined light 221 emitted by the three light sources travels to a scene 231 and then reflects from the scene 231. The reflected light 233 then travels to a lock-in ToF camera 235.

Figure 3B:
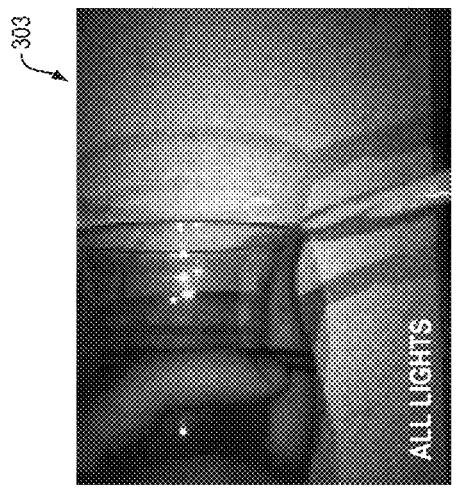
FIG. 3B is an image of the scene illuminated by three different light sources (a left light source, middle light source and right light source).
Figure 3A:
FIG. 3A is an ordinary photograph of a scene.
Figure 3E:
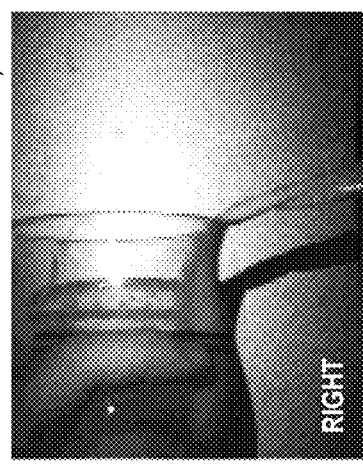
FIG. 3E is a demultiplexed image, which shows the scene as lit by the right light source.
Figure 3D:
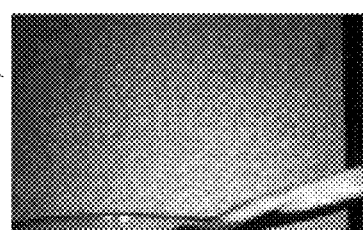
FIG. 3D is a demultiplexed image, which shows the scene as lit by the middle light source.
Figure 3C:
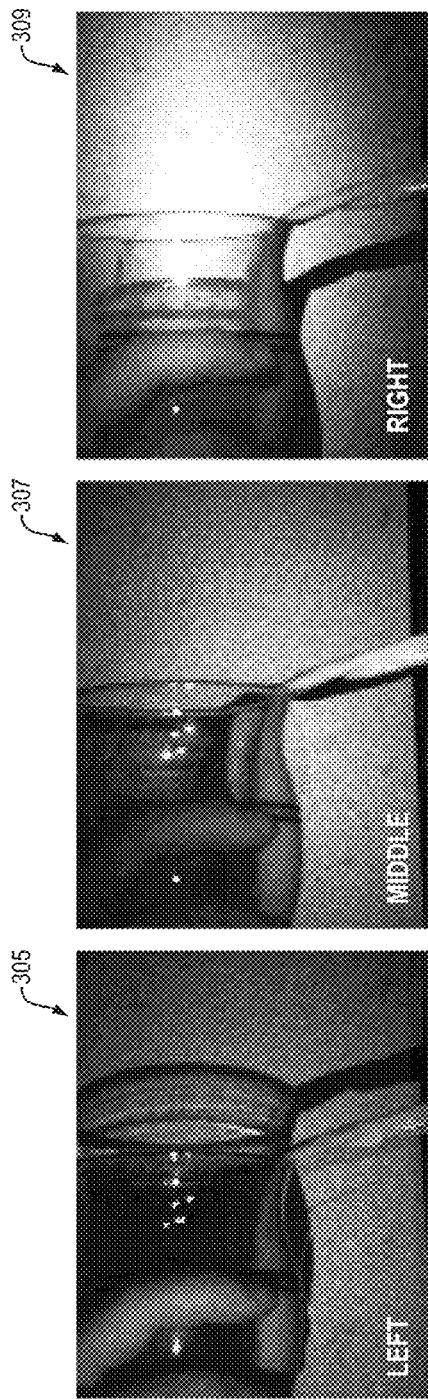
FIG. 3C is a demultiplexed image, which shows the scene as lit by the left light source.

FIG. 3A is an ordinary photograph 301 of a scene, taken by a conventional camera. FIGS. 3B, 3C, 3D and 3E are images of the scene, captured by a prototype of this invention. FIG. 3B is an image 303 of the scene illuminated by three different light sources (a left light source, middle light source and right light source). FIG. 3C is a demultiplexed image 305, which shows the scene as lit only by the left light source. FIG. 3D is a demultiplexed image 307, which shows the scene as lit by only the middle light source. FIG. 3E is a demultiplexed image 309, which shows the scene as lit only by the right light source. As can be seen from FIGS. 3B-3E, the prototype computationally relights the scene.

Figure 4:
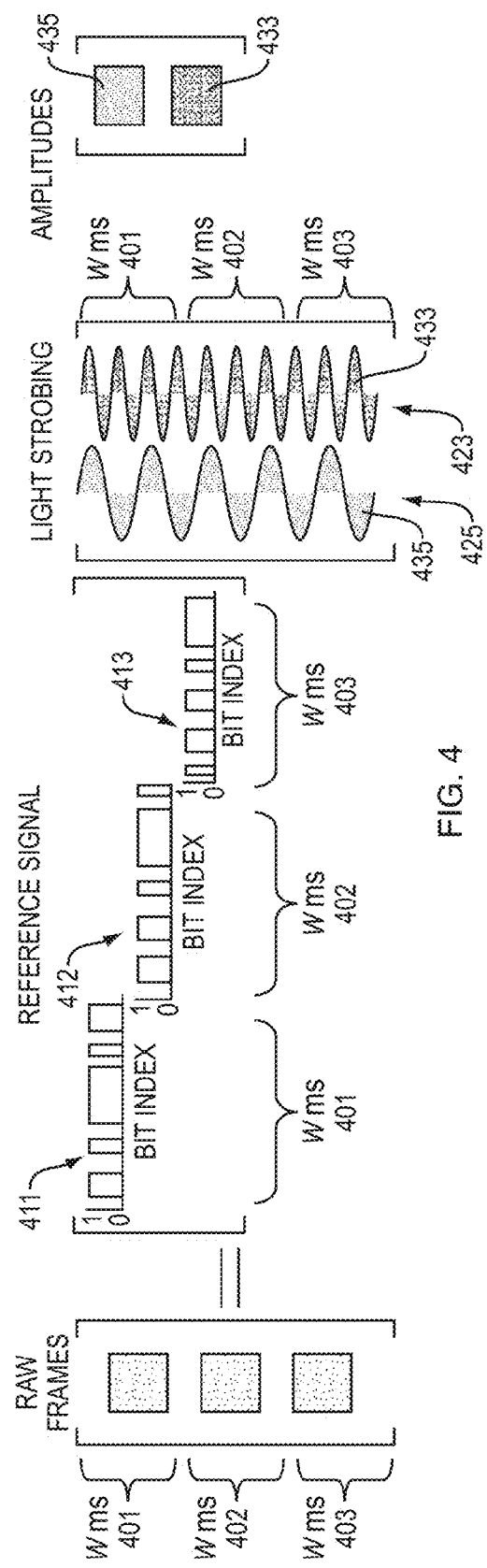
FIG. 4 is a conceptual diagram that shows nanosecond-scale modulation of light sources during millisecond-scale raw frames.

FIG. 4 is a conceptual diagram that shows nanosecond-scale modulation of light sources during millisecond-scale raw frames, in an illustrative implementation of this invention. In FIG. 4, a pixel in a lock-in ToF camera takes measurements during multiple raw frames (e.g., 401, 403, 405). Each raw frame (e.g., 401, 403, 405) has a duration of at least one millisecond. For example, in some cases, each raw frame lasts about two milliseconds.

For each raw frame, the pixel outputs a scalar value equal to the dot product of the reference signal and the measured incident light. The digital reference signal applied to the pixel during raw frames 401, 403, 405 is symbolized in FIG. 4 by charts 411, 412, 413, respectively. The vertical axis of charts 411, 412, 413 is bit value (e.g., 1 and 0, or 1 and −1). The horizontal axis of charts 411, 412, 413 is bit index.

In the example shown in FIG. 4, multiple lights sources are strobed (amplitude modulated) simultaneously during the raw frames. The modulation patterns of the light sources are different; each light source is modulated separately. In many implementations, the strobing frequency of each light source is different than the strobing frequency of the other light sources. For example, in FIG. 4, the strobing frequency of light pattern 423 emitted by one light source is three times greater than the strobing frequency of light pattern 425 emitted by another light source. In illustrative implementations, multiple periods of an illumination modulation signal occur in each raw frame. Indeed, in many implementations, there are tens, hundreds or thousands of periods of an illumination modulation signal in each raw frame. In some cases: (a) the illumination modulation signals are harmonic sinusoids; (b) each raw frame is about 2 milliseconds; and (c) the period of the different light modulation patterns, respectively, ranges from about 1000 nanoseconds (for the fundamental strobing frequency) to about 100 nanoseconds (for the highest harmonic strobing frequency).

In many implementations, the amplitude of the light sources differ. For example, in some cases, one light source emits brighter light than other light sources. In FIG. 4, light pattern 423 emitted by one light source has amplitude 433, and light pattern 425 emitted by another light source has a different amplitude 435.

In the example shown in FIG. 4, the combined light of the multiple light sources illuminates a scene. Light reflects from a point in the scene and travels to the pixel.

For clarity of presentation, only a small number of raw frames, small number of light sources, and low frequency of amplitude modulation are shown in FIG. 4. However, in illustrative implementations, the number of raw frames, number of light sources and frequency of amplitude modulation are greater than shown in FIG. 4.

For example, the number of samples taken (i.e., the number of raw frames) is equal to at least twice the number of light sources. In many cases, it is advantageous to take even more samples (raw frames), in order to improve SNR (signal-to-noise ratio).

The bit patterns of the reference code in the different raw frames are not identical, instead, they are time-shifted versions of a single bit pattern. Each raw frame is a separate sample.

In FIG. 4, the multiplication of the reference code and intensity of incident light symbolizes that the pixel outputs a cross-correlation. The cross-correlation is the sliding dot product of (a) the incident intensity of light reflected from the scene (which is in turn driven by the illumination strobing) and (b) the reference code, as shifted by different amounts.

Figure 5:
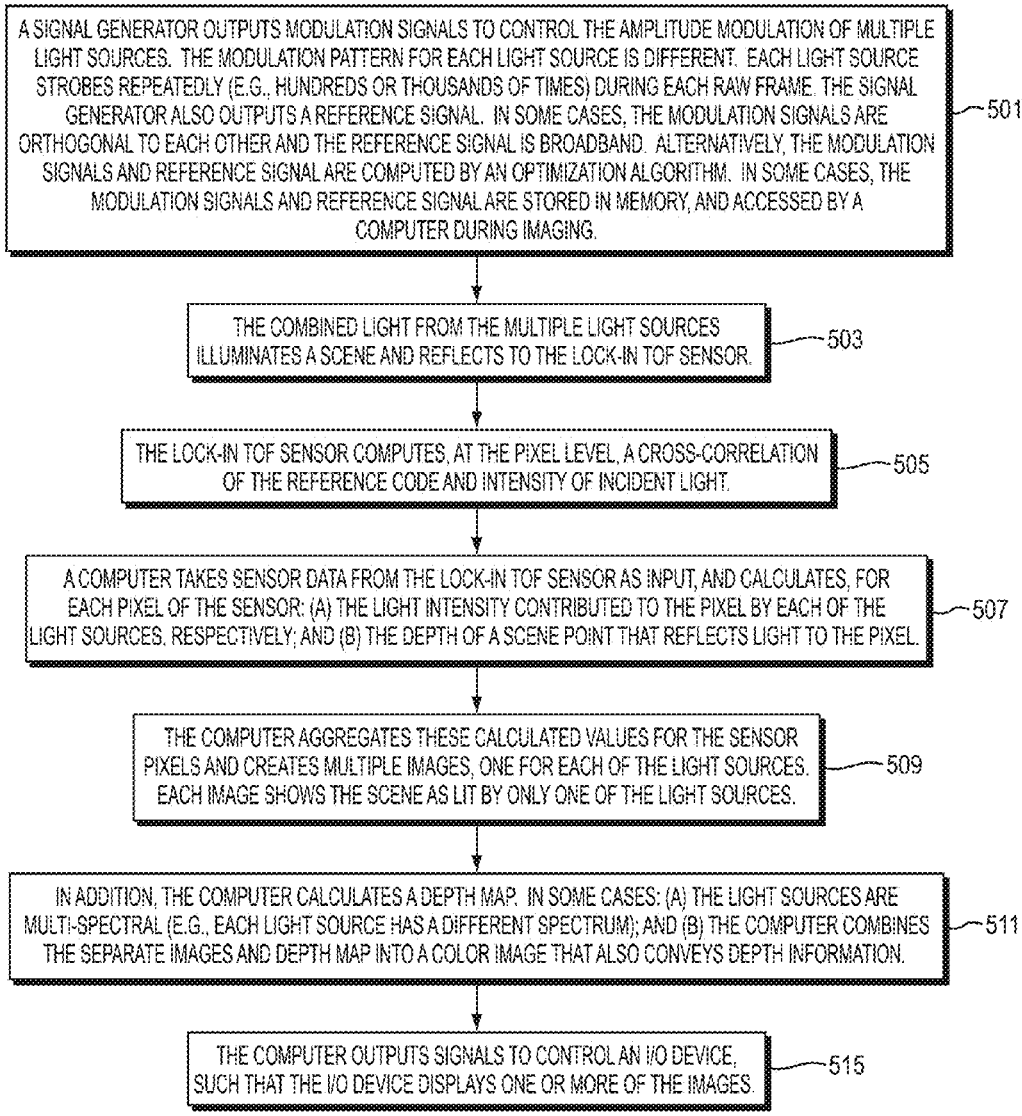
FIG. 5 is a flowchart showing steps in an imaging method.

FIG. 5 is a flowchart showing steps in an imaging method, in an illustrative implementation of this invention. The method in FIG. 5 includes the following steps: A signal generator outputs modulation signals to control the amplitude modulation of multiple light sources. The modulation pattern for each light source is different. Each light source strobes repeatedly (e.g., hundreds or thousands of times) during each raw frame. The signal generator also outputs a reference signal. In some cases, the modulation signals are orthogonal to each other and reference signal is broadband. Alternatively, the modulation signals and reference signal are computed by an optimization algorithm. In some cases, the modulation signals and reference signal are stored in memory, and accessed by a computer during imaging. (Step 501) The combined light from the multiple light sources illuminates a scene and reflects to the lock-in ToF sensor. (Step 503) The lock-in ToF sensor computes, at the pixel level, a cross-correlation of the reference code and intensity of incident light. (Step 505) A computer takes sensor data from the lock-in ToF sensor as input, and calculates, for each pixel of the sensor: (a) the light intensity contributed to the pixel by each of the light sources, respectively; and (b) the depth of a scene point that corresponds to the pixel. (Step 507) The computer aggregates these calculated values for the sensor pixels, and creates multiple images, one for each of the light sources. Each image shows the scene as lit by only one of the light sources. (Step 509) In addition, the computer calculates a depth map. In some cases: (a) the light sources are multi-spectral (e.g., each light source has a different spectrum); and (b) the computer combines the separate images and depth map into a color image that also conveys depth information. (Step 511) The computer outputs signals to control an I/O device, such that the I/O device displays one or more of the images. (Step 515)

In some implementations, the reference code is mathematically represented by a matrix. The matrix has more columns than rows, and is thus sometimes called a "fat" matrix. The matrix includes multi-element blocks of all zeroes. If these blocks were to be removed, then the matrix would be a circulant Toeplitz matrix.

Figure 6A:
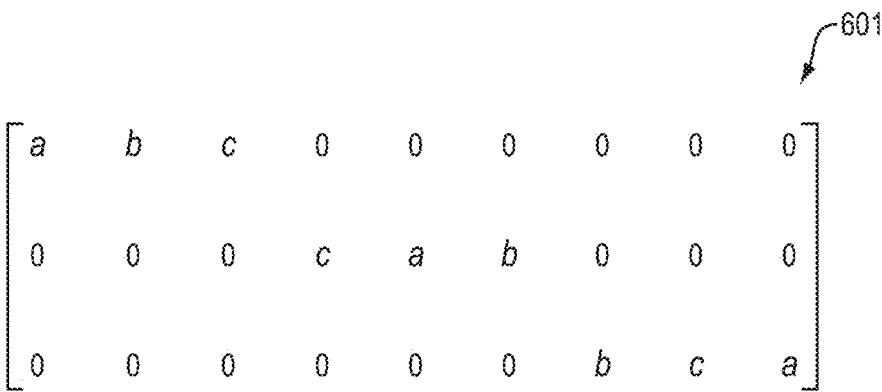
FIG. 6A shows an example of a matrix.

FIG. 6A shows a matrix 601, in an implementation of this invention. In the example shown in FIG. 6A, there are three light sources and the matrix 601 represents a signal a b c. The matrix 601 has m=3 rows, where m is the number of light sources, and has pm columns, where p is the number of shifts (samples). Each raw frame constitutes a sample.

Figure 6B:
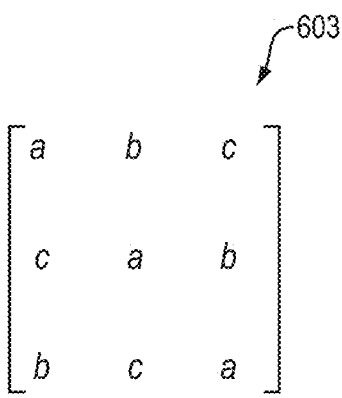
FIG. 6B shows a circulant Toeplitz matrix.

In FIG. 6A, the matrix 601 includes blocks of zeroes. If these blocks were to be removed, the matrix would be a circulant Toeplitz matrix. FIG. 6B shows a circulant Toeplitz matrix 603, created by removing blocks of zeroes from the matrix 601 shown in FIG. 6A.

As a non-limiting example, in some cases in FIGS. 6A and 6B, the signal may be a 3 bit signal, and a=c=1 and b=0.

The modulation signals for the light sources and the reference signal for the lock-in ToF camera (or data indicative of the modulation signals or reference signal) are sometimes herein called "codes". As used herein, a "strobing signal" is a modulation signal that controls amplitude modulation (strobing) of a light source.

The following discussion analyzes: (a) the imaging system; (b) a reference code; and (c) modulation codes for light sources, in illustrative implementations of this invention. In the discussion below, Equations 1 to 23 are all computed at the level of a single pixel.

As is well known, the problem of time multiplexing illumination may be modeled as a pixel-wise linear inverse problem $$y = Hx + \eta \qquad \text{(Equation 1)}$$

where $x \in \mathbb{R}^n$ is a vector of unknowns, $y \in \mathbb{R}^m$ is a measurement vector, $H \in \mathbb{R}^{m \times n}$ is a known matrix, and $\eta \in \mathbb{R}^m$ is an additive noise vector with zero mean and variance $\sigma^2$.

For the specific context of illumination multiplexing, the vector x represents the amplitudes of n light sources, the vector y represents the captured images at m time points, and each column vector of the multiplexing matrix, H, represents the intensity modulation of the light source in time.

Equation 1 may be simplified in the special case of real-valued parameters where the elements of H are between 0 and 1, and where 0 and 1 correspond to the illumination sources being fully off and on, respectively. As an example, consider sequential time multiplexing, which describes a system where only one light is on at a given time. The inverse problem is then $$y = I_n x + \eta \qquad \text{(Equation 2)}$$

where the multiplexing matrix is now $H = I_n$.

To recover the intensities of the light sources from Equation 2, simply invert the system: $\hat{x} = I_n^{-1} y$.

For the more general case in Equation 1, compute the mean squared error of x as $$MSE_{\hat{x}} = \frac{1}{n} \sigma^2 tr\left[(H^T H)^{-1}\right] \qquad \text{(Equation 3)}$$

where tr represents the trace operator and n the number of light sources that are multiplexed.

MSE corresponds to the variance for an unbiased estimator, which allows a relation between mean squared error to a gain in SNR:

$$\text{Gain} = \sqrt{\frac{\sigma^2}{MSE_{\hat{x}}}} \qquad \text{(Equation 4)}$$

A goal is then to find a multiplexing matrix, which is optimal in the sense of maximizing SNR, or equivalently, minimizing $MSE_{\hat{x}}$:

$$\arg\min_H MSE_{\hat{x}}, s \cdot t \cdot H \in \mathcal{H} \qquad \text{(Equation 5)}$$

where $\mathcal{H}$ is a set of domain-specific constraints.

The lock-in ToF camera strobes a light source using a discrete time illumination control signal $i_\omega[t]$, $t = 0, \ldots, n$, and receives, from the scene environment, a discrete time optical signal $\xi_\omega[t]$. The subscript $\omega$ represents the fundamental/strobing frequency of the signal. The relative difference in phase, $\phi$ between $\xi_\omega[t]$ and a discrete time reference signal $r_\omega[t]$ is used to calculate the physical distance of objects:

$$d = \frac{c\varphi}{4\pi\omega} \qquad \text{(Equation 6)}$$

where c is the speed of light and d is the distance.

Denote discrete signals using vector notation, $$i_\omega = \text{vec}(i_\omega[t]), i_\omega \in \mathbb{R}^m \qquad \text{(Equation 7)}$$

The dimensions of ToF signals are as follows; $r_\omega \in \mathbb{R}^m$, $\xi_\omega \in \mathbb{R}^m$ and $i_\omega \in \mathbb{R}^m$. To calculate phase offset the measured optical signal is crosscorrelated with the reference code:

$$c_\omega = \xi_\omega \otimes r_\omega = \xi_\omega * \overline{r_\omega} \qquad \text{(Equation 8)}$$

where $\otimes$ denotes the cross correlation operator and $*$ the convolution operator, $c_\omega$ denotes the cross-correlation vector, and $\overline{(\cdot)}$ denotes a flip of the vector, that is $\overline{f}[t] = f[-t]$.

The phase offset, $\phi$, corresponds to the location of the maximum in $c_\omega$, or in Fourier domain, the angle of the fundamental frequency, $\omega$. Equation 8 can also be formulated in frequency domain using the Fourier duality, $$c_{107} F^{-1}\{F\{c_\omega\}\} \Leftrightarrow F^{-1}\{F\{\xi_{107}\} \cdot F\{\overline{r_\omega}\}\} \qquad \text{(Equation 9)}$$

where $F\{\cdot\}$ denotes the Fourier transform. There are n number of illumination control vectors $i_{\omega,1}, \ldots, i_{\omega,n}$, but only one of the reference and optical signals.

The cross-correlation occurs at the pixel level of the ToF camera. In particular, to obtain m samples of the correlation vector, the ToF camera acquires m pictures of the scene, where in each picture, the signals, $\xi_\omega$ and $r_\omega$ are at a different phase offset. In that sense, the time of flight camera is a multi-shot imaging technique with pixel level cross-correlation.

A signal generator (e.g., 123) generates both the reference signal and control signal of the light sources, and thus has direct control over $r_\omega$ and $i_\omega$ and, by extension, control of $\xi_\omega$.

The measurement in each pixel in each raw frame represents the inner product of the reference code and the corresponding strobing signal. To simplify the model, consider periodic forms for the strobing signal where the period is much less than the exposure time of a raw frame. For example, the raw frame is roughly 2 ms and the period of the strobing signal g, on the order of nanoseconds. Then, each raw frame is assumed to have an identical strobing signal and the problem is recast in terms of convolution. In particular, each pixel of the ToF camera measures a linear combination of the different convolutions between the environment vectors $\xi_{\omega,1}, \ldots, \xi_{\omega,n}$ and the reference code $r_\omega$, where the environment vectors $\xi_{\omega,1}, \ldots, \xi_{\omega,n}$ correspond to light reflecting from n different light sources.

The resulting system is $$c_\omega = \begin{bmatrix} \uparrow & & \uparrow \\ \xi_{\omega,1} \otimes r_\omega & \cdots & \xi_{\omega,n} \otimes r_\omega \\ \downarrow & & \downarrow \end{bmatrix} \begin{bmatrix} x_1 \\ \vdots \\ x_n \end{bmatrix} \qquad \text{(Equation 10)}$$

Accounting for noise, and simplifying the system, gives:

$$c_\omega = TLx + \eta \qquad \text{(Equation 11)}$$

where (a) $T \in \mathbb{R}^{m \times pm}$ is a matrix formed from the p length reference code, (b) the $k^{th}$ column of $L \in \mathbb{R}^{p \times n}$ the optical signal $\xi_{\omega,k}$, (c) $x \in \mathbb{R}^{n \times 1}$, (d) $c_\omega \in \mathbb{R}^{m \times 1}$, and (e) m is the number of samples (raw frames) taken. (m is also the number of shifts of the reference code, because the reference code is shifted by a different amount in each raw frame.)

A simple example of T is shown in FIG. 6A. In the example shown in FIG. 6A, T is formed from a reference code that is only three bits long. In typical implementations, however, the reference code is much longer than 3 bits. If the blocks of zeros were to be removed from T (i.e., if the zero entries were to be deleted from each row of T, thereby reducing the number of columns of T), the resulting matrix would be a circulant Toeplitz matrix. An example of a circulant Toeplitz matrix formed by removing blocks of zeros is shown in FIG. 6B.

Additive noise characterization in a ToF camera is expressed as covariance matrix, $\Sigma$ of the noise. To estimate $\hat{x}$, consider the best linear unbiased estimator (BLUE) for Equation 11, that is, $$\hat{x}_{BLUE} = (L^T T^T \Sigma^{-1} TL)^{-1} L^T T^T \Sigma^{-1} c_\omega \quad \text{(Equation 12)}$$

which is a weighted least squares on the positive semidefinite matrix $\Sigma$.

In illustrative implementations of this invention, it is desirable to find the optimal codes, i.e., the single reference vector that determines T and the n column vectors $\xi_{\omega,1}, \ldots, \xi_{\omega,n}$ that comprise L.

In some implementations of this invention, a computer performs an optimization algorithm to solve Equation 11 for the decision variables T and L. In some cases, the optimization algorithm includes characterizing all of the noise sources in the model, then solving a semidefinite program, and optimizing for non-negative matrix factorization. In some cases, a computer: (a) performs this optimization algorithm in advance (i.e., before starting imaging); (b) then stores the calculated values of T and L (and thus values of the modulation signals for the light sources and the reference signal for the ToF camera) in memory, and (c) then accesses these pre-computed values of T and L during imaging.

Alternatively, in some cases, the modulation signals for the light sources and the reference code for the ToF camera are selected as follows: L is an orthogonal matrix and the reference code $r_\omega$ is broadband in frequency domain. As a result, the matrix M is an orthogonal matrix.

The columns of matrix L encode the modulation signals for the light sources. Each column of matrix L encodes the modulation signal for one of the light sources. In this alternative approach, L is an orthogonal matrix, and thus the modulation signals of the light sources (which are encoded in the columns of L) are orthogonal to each other.

Thus, this alternative approach may be described as follows: (a) the modulation signals for the light sources are orthogonal to each other and (b) the reference signal is a broadband signal.

This alternative approach completely avoids using an optimization and does not require knowledge of the noise sources in the scene. There are trade-offs, e.g., the codes used in this alternative approach may not be optimal in the sense of SNR, but this alternative approach is much simpler and still allows multiplexing and demultiplexing of multiple illumination sources and allows RGBD.

According to principles of this invention, this alternative approach (in which the modulation signals are orthogonal to each other and the reference signal is broadband), works for the following reasons:

The linear inverse problem for a ToF camera (Equation 11) may be viewed as a preconditioned version of the classic time multiplexed inverse problem. According to principles of this invention, Equation 1 may be written in terms of the ToF signals:

$$y = Hx \mapsto y = \Sigma_{k=1}^n \xi_{\omega,k} = y = Lx \quad \text{(Equation 13)}$$

Since $c_\omega = TLx = Ty$, the preconditioning step is:

$$y = Lx \xrightarrow{T(\cdot)} Ty = TLx \quad \text{(Equation 14)}$$

Circulant matrices offer an intuitive viewpoint of preconditioning: the Fourier spectrum of the vector code corresponds to the eigenvalues of the matrix. Choosing the correct reference code allows the preconditioner operator to stabilize the eigenvalues of the inversion, which makes the overall problem better conditioned. Of course, choosing the wrong matrix to precondition will only make the problem much worse. For instance, the classic form for $r_\omega$ in a conventional ToF camera is a box function, which, in its Toeplitz form T is characterized by a very high condition number.

In some implementations, the matrix M is an orthogonal matrix. Making M an orthogonal matrix exploits, among other properties, the fact that an orthogonal matrix has a condition number of 1.

Note that if matrix M is an orthogonal matrix, then L is an orthogonal matrix and the reference code $r_\omega$ is broadband in frequency domain. The first part of this proposition (i.e., that L is orthogonal if M is orthogonal) follows from the fact that $M^T M = I$ and therefore $L_i^T T^T T L_j = 0 \forall i \neq j$. The second part of this proposition (i.e., that the reference code is broadband if M is orthogonal) follows from the properties of condition numbers. If L is orthogonal, then the optimal preconditioner matrix has all eigenvalues equal. Since T is a circulant matrix, the spectrum of $r_\omega$ corresponds to the eigenvalues and is spectrally flat.

Thus, this alternative approach may be summarized as follows: (i) use a reference code that is broadband; and (ii) use codes for light sources that are orthogonal. For example, in some cases, strobe light sources at harmonic sine functions and use an m-sequence as the reference code. (Harmonic sine functions are orthogonal to each other, and an m-sequence is an example of a broadband code). A non-limiting example of a broadband reference code used in this invention is 10100110100001100010100110100000000 10000000101000000100000011001.

It is desirable that the reference code is not a delta function (i.e., a code with only one non-zero bit). Having only one non-zero bit (i.e., being a delta function) is a disadvantage for at least two reasons: (a) it tends to decrease the SNR and (b) the signal non-zero bit is implemented as a narrow square code (which, when represented by a Toeplitz matrix, has a high condition number, due to the nulls of the discrete Fourier transform spectrum).

As noted above, in some implementations of this invention, a computer performs an optimization algorithm to solve Equation 11 for the decision variables T and L.

Many different optimization algorithms may be used to solve Equation 11, in illustrative implementations of this invention. The following is a non-limiting example of a method of solving Equation 11. In this example, the computer performs an optimization algorithm that includes characterizing all of the noise sources in the model, solving a semidefinite program and optimizing for non-negative matrix factorization.

In this non-limiting example, a computer performs a convex algorithm to optimize the reference and illumination codes. In this example, optimization of the codes is done once, in advance of imaging.

To avoid optimizing the gain directly for T and L, Equation 11 is simplified as follows:

$$c_\omega = Mx + \eta \quad \text{(Equation 15)}$$

where M is substituted for the product of T and L.

This allows the algorithm to first derive the optimal M, which is an easier problem to solve as there are no constraints on matrix structure. Σ is the covariance model for the vector x:

$$\Sigma = \mathbb{E}\left[(\hat{x} - \mathbb{E}[\hat{x}])(\hat{x} - \mathbb{E}[\hat{x}])^T\right] \quad \text{(Equation 16)}$$

where $\mathbb{E}$ denotes the expectation operator.

The resulting mean squared error is $$MSE = \frac{1}{n} tr\left[(M^T \Sigma^{-1} M)^{-1}\right] \quad \text{(Equation 17)}$$

Equation 17 is the more general form of Equation 3. In Equation 3, the noise was i.i.d. (independent and identically distributed), which allowed factorization of the variance outside the trace. Here, Σ is independent (but not necessarily identically distributed), and so $\Sigma = \text{diag}(\sigma_1^2, \ldots, \sigma_m^2)$. In some cases, the noise sources are decomposed into various sources. For the time of flight camera, the variance in the $k^{th}$ measurement is $$\sigma_k^2 = \sigma_{read}^2 + \sigma_{clock}^2 + \sigma_{dark}^2 + \sigma_{photon}^2 \quad \text{(Equation 18)}$$

where photon noise is proportional to the incoming signal, and clock noise is proportional to the smoothness of the reference code $r_\omega$.

Read noise and dark noise are signal independent. An ideal system is assumed, in which the noise sources are solely due to the sensor and not due to discrete components, such as the analog to digital converter (ADC). In addition, clock noise is ignored, as it is usually negligible in context of read and shot noise. By taking into account the box constraint, Equation 17 is cast as an optimization program:

$$\underset{M}{\text{argmin}} \frac{1}{n} tr\left[(M^T \Sigma^{-1} M)^{-1}\right] \text{ s.t. } 1 \succeq vec(M) \succeq 0 \quad \text{(Equation 19)}$$

where $\succeq$ denotes a component-wise inequality for vectors and linear matrix inequalities for matrices.

Equation 19 is more complicated to optimize than Equation 3. Thus, Equation 19 is recast as a semidefinite program, $$M^* = \underset{Q}{\text{argmin}} \, tr(Q) \text{ s.t.} \quad \text{(Equation 20)}$$

$$1 \succeq vec(M) \succeq 0, Q \succeq (M^T \Sigma^{-1} M)^{-1}$$

where Q is an auxiliary variable and $Q - (M^T \Sigma^{-1} M)^{-1}$ is a positive semidefinite matrix.

This program is not convex, but after linearization, may be solved to yield an optimal matrix for time multiplexing M★.

Optimizing T and L is now posed as a matrix factorization problem where $$M\star = T\star L\star \quad \text{(Equation 21)}$$

Recall that for the physical system, T★ is a circulant Toeplitz matrix and values of T★ and L★ are constrained between 0 and 1. This problem is posed as a nonnegative matrix factorization (NMF) with constraints $$\{T^*, L^*\} = \underset{T,L}{\text{argmin}} \|M^* - TL\|_F \text{ s.t.} \quad \text{(Equation 22)}$$

$$1 \succeq vec(T) \succeq 0, 1 \succeq vec(L) \succeq 0, T \in C$$

where the set $C \subset \mathbb{R}^{m \times p}$ represents the subspace of circulant Toeplitz matrices and $\|\cdot\|_F$ denotes the Frobenius norm.

In this example, convex optimization is used to solve Equation 22. In order to account for the circulant constraint, a computer solves the optimization problem by finding the closest circulant approximation:

$$\underset{C \in C}{\text{argmin}} \|T^{(k)} - C\|_F \quad \text{(Equation 23)}$$

where $T^{(k)}$ is the $k^{th}$ iterative update.

In this example, Equation 23 is solved in closed form, where graphically speaking, the $p^{th}$ entry of the circulant matrix is the mean value of the $p^{th}$ diagonal of $T^{(k)}$.

In this example, convex optimization is implemented by CVX (Matlab® software for solving convex optimization problems).

This invention is not limited to convex optimization. For example, in some cases, explicit update rules are used.

In illustrative implementations of this invention, depth of a scene point that reflects light to a pixel is determined from the relative phase difference between the light emitted by a light source and the reference code applied to the pixel. See Equation 4. There are many ways to measure the phase difference. In some implementations, the relative phase difference between the emitted light and incident light is determined as follows. Each pixel of the lock-in ToF camera measures a cross-correlation function of (a) the measured light incident on the pixel and (b) the reference code applied to the pixel. A computer calculates an FFT (fast Fourier transform) of the cross-correlation function. The computer determines (from the FFT) the fundamental frequency of the cross-correlation waveform. The fundamental frequency of the cross-correlation waveform is the inverse of the shortest period of the cross-correlation waveform. The computer calculates the angle (in a magnitude and angle description of a signal) of the fundamental frequency. The angle of the fundamental frequency is the relative phase difference. A computer takes the relative phase difference as an input, and calculates (by solving Equation 4) the depth of a scene point that reflects light to the pixel.

The magnitude of the steady state (so-called "DC") component of the frequency spectrum of incident light (and of the cross-correlation waveform) corresponds to the intensity of steady-state ambient light. Therefore, the ambient light is distinguishable from the strobing signals, which are time-varying. For clarity in exposition in this document, ambient light is disregarded in most discussions (e.g., when discussing total light incident on a pixel). In illustrative implementations, even if steady-state ambient light does exist, the DC component of the frequency spectrum that corresponds to the steady-state ambient light does not affect the computation of the amplitudes of the light emitted by the respective light sources.

Figure 8:
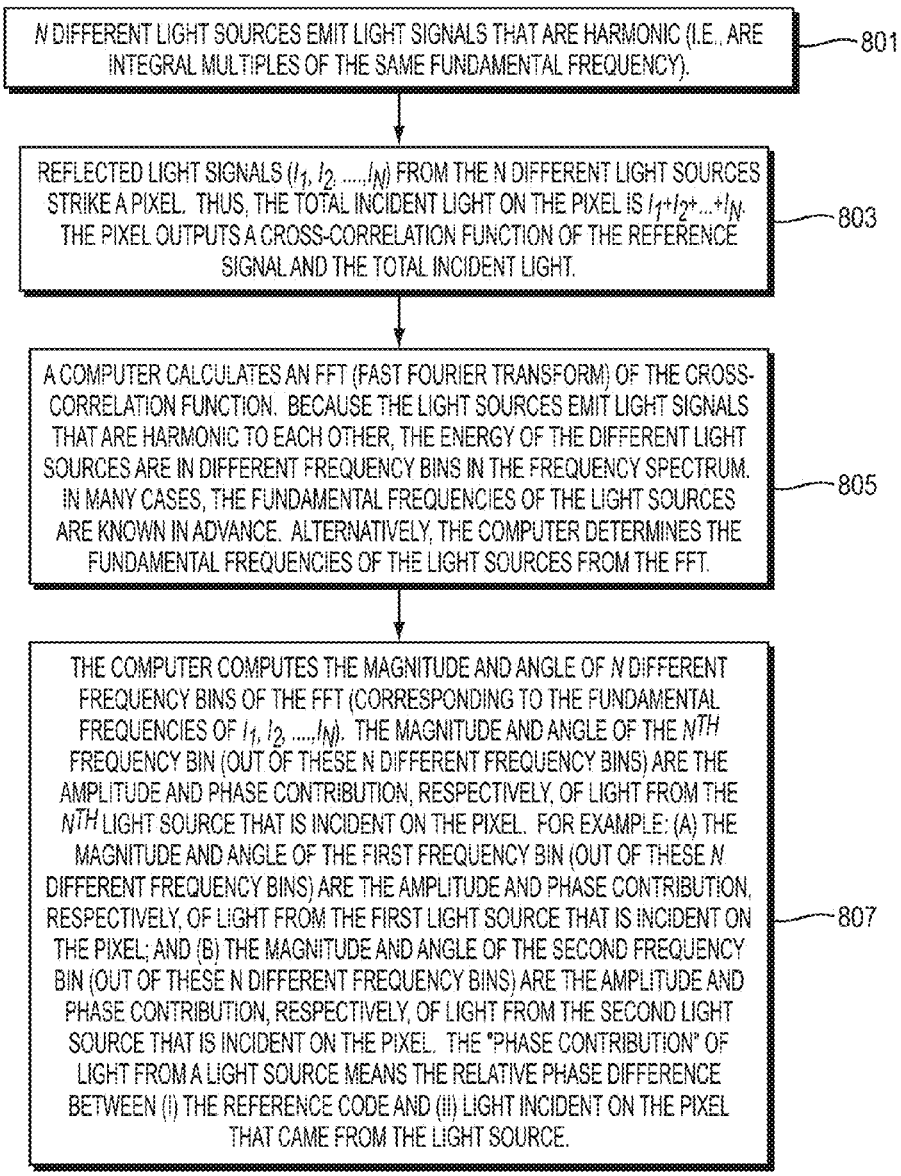
FIG. 8 shows steps in a method of demultiplexing harmonic light sources.

FIG. 8 shows steps in a method of demultiplexing harmonic light sources, in an illustrative implementation of this invention. In the example shown in FIG. 8: (a) the light sources emit light signals that are harmonic to each other; and (b) scene depth and light intensity contributed by each light source are determined for each pixel of a lock-in ToF camera. The method shown in FIG. 8 includes the following steps: n different light sources emit light signals that are harmonic (i.e., are integral multiples of the same fundamental frequency) (Step 801). Reflected light signals ($I_1, I_2, \ldots, I_n$) from the n different light sources strike a pixel. Thus, the total incident light on the pixel is $I_1+I_2+\ldots+I_n$. The pixel outputs a cross-correlation function of the reference signal and the total incident light (Step 803). A computer calculates an FFT (fast Fourier transform) of the cross-correlation function. Because the light sources emit light signals that are harmonic to each other, the energy of the different light sources are in different frequency bins in the frequency spectrum. In many cases, the fundamental frequencies of the light sources are known in advance. Alternatively, the computer determines the fundamental frequencies of the light sources from the FFT (Step 805). The computer computes the magnitude and angle of n different frequency bins of the FFT (corresponding to the fundamental frequencies of $I_1, I_2, \ldots, I_n$). The magnitude and angle of the $n^{th}$ frequency bin (out of these n different frequency bins) are the amplitude and phase contribution, respectively, of light from the $n^{th}$ light source that is incident on the pixel. For example: (a) the magnitude and angle of the first frequency bin (out of these n different frequency bins) are the amplitude and phase contribution, respectively, of light from the first light source that is incident on the pixel; and (b) the magnitude and angle of the second frequency bin (out of these n different frequency bins) are the amplitude and phase contribution, respectively, of light from the second light source that is incident on the pixel. The "phase contribution" of light from a light source means the relative phase difference between (i) the reference code and (ii) light incident on the pixel that came from the light source (Step 807). In illustrative implementations, the light sources and ToF sensor are at the same distance from the scene, or the depth of each light source relative to the ToF sensor is known in advance.

Figure 9:
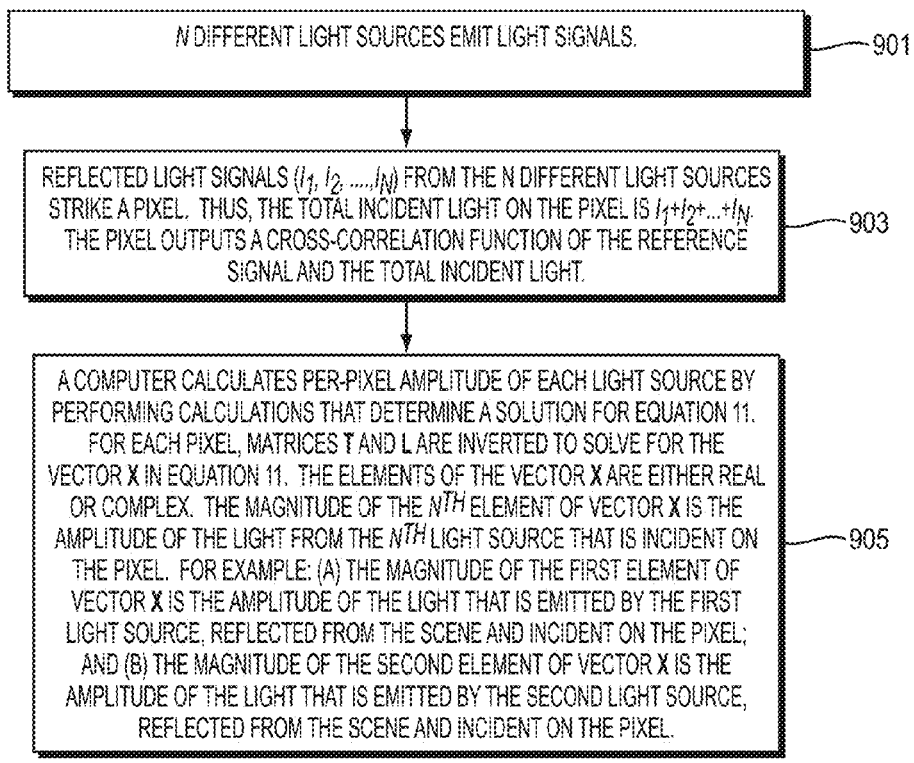
FIG. 9 shows steps in a method of demultiplexing light sources.

FIG. 9 shows steps in a method of demultiplexing light sources, in an illustrative implementation of this invention. In the example shown in FIG. 9, light intensity contributed by each light source is determined for each pixel of a lock-in ToF camera. The method shown in FIG. 9 works regardless of whether or not the light sources emit harmonic light signals. The method shown in FIG. 9 includes the following steps: n different light sources emit light signals (Step 901). Reflected light signals from the n different light sources strike a pixel. Thus, the total incident light on the pixel is $I_1+I_2+\ldots+I_n$. The pixel outputs a cross-correlation function of the reference signal and the total incident light (Step 903). A computer calculates per-pixel amplitude of each light source by performing calculations that determine a solution for Equation 11. For each pixel, matrices T and L are inverted to solve for the vector x in Equation 11. The elements of the vector x are either real or complex. The magnitude of the $n^{th}$ element of vector x is the amplitude of the light from the $n^{th}$ light source that is incident on the pixel. For example: (a) the magnitude of the first element of vector x is the amplitude of the light that is emitted by the first light source, reflected from the scene and incident on the pixel; and (b) the magnitude of the second element of vector x is the amplitude of the light that is emitted by the second light source, reflected from the scene and incident on the pixel (Step 905).

In illustrative implementations, each raw frame of the ToF camera (including exposure and readout) samples one step of the correlation waveform. In illustrative implementations, a "depth frame" consists of multiple raw frames. For example, in some cases, a depth frame consists of 4, 6, or 8 raw frames. For each depth frame, depth is determined for each pixel of the ToF camera.

In an illustrative implementation of this invention: (a) each raw frame (including readout and exposure) is roughly 2 ms; (b) the ToF camera captures roughly 500 raw frames per second; and (c) the prototype demultiplexes roughly 15 lights at 30 depth frames per second.

In some cases, one or more tangible, non-transitory machine-readable media are employed. Each machine-readable medium stores instructions for one or more programs. In some cases, the programs include instructions for, among things, generating modulation signals (which control amplitude modulation of the light sources), generating a reference code, estimating scene depth and estimating the separate contribution of each light source.

Figure 7:
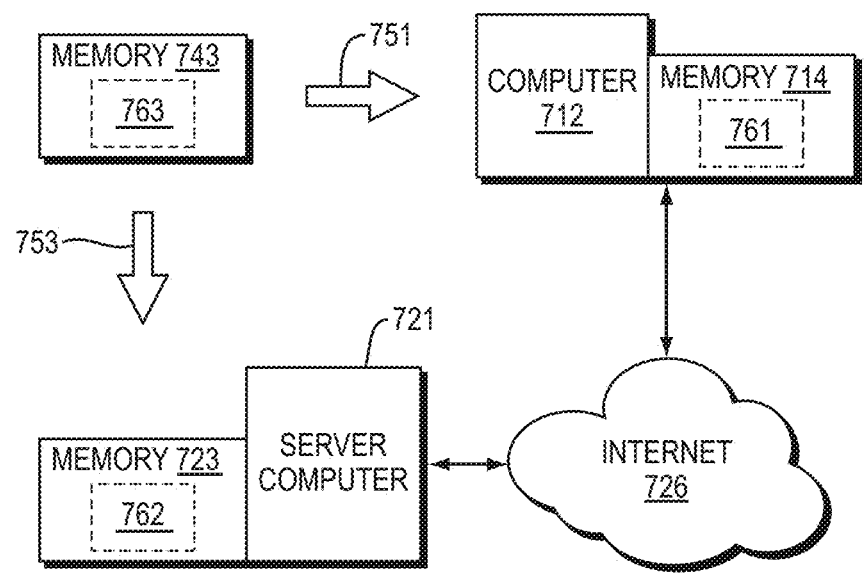
FIG. 7 shows an example of machine-readable media.

In the example shown in FIG. 7, three non-transitory machine-readable media 761, 762, 763 store identical copies of these programs. Thus, each of the machine-readable media 761, 762, 763 stores the instructions for these programs.

In FIG. 7, machine-readable medium 761 is part of memory device 714 for one or more computers 712. One or more computers 712 (and machine-readable medium 761 and memory 714) are housed in a lock-in ToF sensor or are positioned external to the lock-in ToF sensor. One or more computers 712 execute these programs, including for, among things, generating modulation signals (which control amplitude modulation of the light sources), generating a reference code, estimating scene depth and demultiplexing the light sources.

In FIG. 7, machine-readable medium 762 is part of memory device 723, which is part of, or auxiliary to, server computer 721. Server computer 721 is connected to the Internet 726. In some cases, the program is downloaded from the server computer via the Internet 726. For example, in some cases, the download involves transferring a copy of the encoded program instructions from machine-readable medium 762 to server computer 721, then over the Internet 726 to computer 712, and then to machine-readable medium 761, which is part of memory device 714.

In FIG. 7, machine-readable medium 763 comprises all or part of a memory device 743. For example, in some cases, machine-readable medium 763 stores a master copy or backup copy of the encoded program instructions. In some cases, the program instructions encoded in the master copy are copied 751 into machine-readable medium 761 during manufacturing. In some cases, the program instructions encoded in the master copy are copied 753 into machine-readable medium 762, which is used in downloading the program, as discussed above.

In some cases, a non-transitory, machine-readable medium (e.g., 761, 762, or 763) comprises part or all of an electronic memory storage device, such as a RAM (random-access memory), DRAM (dynamic random-access memory), ROM (read only memory), PROM (programmable read only memory), EPROM (erasable programmable read only memory), or EEPROM (electrically erasable programmable read only memory) device; and (b) the program is encoded in voltage levels in a set of electronic components (e.g., flip-flops or latches) in the medium. In some cases: (a) voltage levels in hardware components of the machine-readable medium encode a set of logic states that do not change throughout an entire time interval that has a non-zero duration, and (b) the hardware components of the machine-readable medium exist throughout this entire time period. Alternatively, a machine-readable medium (e.g., 761, 762, or 763) comprises part or all of a CD-ROM or other optical disc storage device, and a computer reads data or instructions stored in the CD-ROM by using an optical disc driver. Computers In exemplary implementations of this invention, one or more electronic computers (e.g., 131, 123, 712) are programmed and specially adapted: (1) to control the operation of, or interface with, hardware components of an imaging system, including multiple light sources and any camera, including a lock-in time of flight camera; (2) to calculate or generate any modulation signal for controlling light sources; (3) to calculate or generate any reference signal (e.g., a reference signal applied to a time-of-flight camera); (4) to calculate a light intensity, for each respective light in a set of multiple light sources that illuminate a scene, which light intensity corresponds to the separate contribution made by the respective light source; (5) to calculate depth in a scene; (6) to perform any other calculation, computation, program, algorithm, computer function or computer task described or implied above; (7) to receive signals indicative of human input; (8) to output signals for controlling transducers for outputting information in human perceivable format; and (9) to process data, to perform computations, to execute any algorithm or software, and to control the read or write of data to and from memory devices. The one or more computers may be in any position or positions within or outside of the lock-in ToF sensor. For example, in some cases (a) at least one computer is housed in or together with other components of the ToF sensor, and (b) at least one computer is remote from other components of the ToF sensor. The one or more computers are connected to each other or to other components in the ToF camera either: (a) wirelessly, (b) by wired connection, or (c) by a combination of wired and wireless links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of an imaging system, including multiple light sources and any camera, including a lock-in time of flight camera; (2) to calculate or generate any modulation signal for controlling light sources; (3) to calculate or generate any reference signal (e.g., a reference signal applied to a time-of-flight camera); (4) to calculate a light intensity, for each respective light in a set of multiple light sources that illuminate a scene, which light intensity corresponds to the separate contribution made by the respective light source; (5) to calculate depth in a scene; (6) to perform any other calculation, computation, program, algorithm, computer function or computer task described or implied above; (7) to receive signals indicative of human input; (8) to output signals for controlling transducers for outputting information in human perceivable format; and (9) to process data, to perform computations, to execute any algorithm or software, and to control the read or write of data to and from memory devices.

Network Communication

In illustrative implementations of this invention, one or more electronic devices (e.g., 131, 123, 712, 101, 102, 115) are configured for wireless or wired communication with other electronic devices in a network.

For example, in some cases, one or more computers (e.g., 131, 712), a signal generator (e.g., 123) and light sources (e.g., 101, 102, . . . , 115) each include a wireless communication module for wireless communication with other electronic devices in a network. Each wireless communication module includes (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 131, 123, 712) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

DEFINITIONS

The terms "a" and "an", when modifying a noun, do not imply that only one of the noun exists.

To compute "based on" specified data means to perform a computation that takes the specified data as an input.

To say that a signal is "broadband" with respect to a sampling rate means that, for frequencies of the signal that are less than one half of the sampling rate, all spectral coefficients of the signal have a signal-to-noise ratio that is greater than 3 dB.

Here are some non-limiting examples of a "camera": (a) a digital camera; (b) a video camera; (c) a light sensor, (d) a set or array of light sensors; (e) an imaging system; (f) a time-of-flight camera; or (g) an optical instrument that records images. A camera includes any computers or circuits that process data captured by the camera.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

"Equation 4" means Equation 4 above.

"Equation 11" means Equation 11 above.

"Equation 12" means Equation 12 above.

"Equation 20" means Equation 20 above.

"Equation 22" means Equation 22 above.

"Equation 23" means Equation 23 above.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. For example, an I/O device includes any device for (a) receiving input from a human, (b) providing output to a human, or (c) both. For example, an I/O device includes a user interface, graphical user interface, keyboard, mouse, touch screen, microphone, handheld controller, display screen, speaker, or projector for projecting a visual display. Also, for example, an I/O device includes any device (e.g., button, dial, knob, slider or haptic transducer) for receiving input from, or providing output to, a human.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

As used herein, a "lock-in time of flight camera" (also called a "lock-in ToF camera", "time of flight camera", or "ToF camera") means a camera that measures a phase difference between a light signal emitted by an active light source and a light signal incident on the camera.

As used herein, (i) a single scalar is not a "matrix", and (ii) one or more entries, all of which are zero (i.e., a so-called null matrix), is not a "matrix".

To "multiply" includes to multiply by an inverse. Thus, to "multiply" includes to divide.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

The term "pixel" is defined elsewhere in this document.

As used herein, to say that the energy of a signal is "predominantly" located in narrow frequency band that matches a strobing frequency means that a majority of the energy of the signal occurs in a frequency band, where the lower bound of the frequency band is equal to the strobing frequency minus one half of one percent of the strobing frequency and the upper bound of the frequency band is equal to the strobing frequency plus one half of one percent of the strobing frequency. Similarly, to say that the energy of a reference signal is non-zero in frequency bands that match the strobing frequencies of the light sources, respectively, means that the energy of the reference signal is non-zero in a set of frequency bands, where the frequency bands are centered on the strobing frequencies, respectively, such that the each frequency band is centered on a given strobing frequency and has a range of plus or minus one half of one percent of the given strobing frequency.

The term "raw frame" is defined elsewhere in this document.

As used herein, the term "set" does not include a group with no elements. Mentioning a first set and a second set does not, in and of itself, create any implication regarding whether or not the first and second sets overlap (that is, intersect).

"Some" means one or more.

To "strobe" a light source means to vary, over time, the intensity or amplitude of light emitted by the light source. The term "strobe" is not limited to periodic variation. The term "strobe" is not limited to any particular type or shape of light signal, such as a square wave or sinusoid.

"ToF" means time of flight.

As used herein, a "subset" of a set consists of less than all of the elements of the set.

"Substantially" means at least ten percent. For example: (a) 112 is substantially larger than 100; and (b) 108 is not substantially larger than 100.

The term "such as" means for example.

To say that a machine-readable medium is "transitory" means that the medium is a transitory signal, such as an electromagnetic wave.

A matrix may be indicated by a bold capital letter (e.g., D). A vector may be indicated by a bold lower case letter (e.g., α). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses. In each case described in this paragraph, Applicants are acting as their own lexicographer.

Variations

This invention may be implemented in many different ways. Here are some non-limiting examples:

In one aspect, this invention is a method comprising, in combination: (a) a set of multiple light sources illuminating a scene; (b) a signal generator generating a reference signal and a set of multiple modulation signals, such that, while the light sources illuminate the scene (i) the modulation signals control amplitude of light emitted by the light sources, causing the amplitude of light emitted by each light source to vary over time; (ii) the modulation signal for each light source is different than the modulation signal for the other light sources, and (iii) the modulation signals overlap in time and cause two or more of the light sources to simultaneously emit light during multiple time intervals of the modulation signals; (c) each pixel in the camera (i) measuring an incident intensity, which incident intensity is intensity of light that reflects from the scene and is incident on the pixel, and (ii) outputting data indicative of a cross-correlation of the incident intensity and the reference signal; and (d) a computer taking the data as an input and estimating, for each pixel of the camera (i) a separate intensity for each respective light source, out of the set of light sources, which separate intensity is intensity of light that (A) is emitted by the respective light source and not by other light sources, (B) then reflects from the scene and (C) then travels to the pixel, and (ii) depth of a point in the scene that reflects light to the pixel. In some cases, the modulation signals are orthogonal to each other. In some cases: (a) the camera has a sampling rate, which sampling rate is equal to the number of raw frames of the camera per second; and (b) the reference signal is broadband with respect to the sampling rate. In some cases: (a) the camera has a rate sampling rate, which sampling rate is equal to the number of raw frames of the camera per second; and (b) the modulation signals are orthogonal to each other and the reference signal is broadband with respect to the sampling rate. In some cases, data indicative of the modulation signals and reference signal: (a) is stored in an electronic memory device; and (b) is read from the memory device and is used by a signal generator that generates the modulation signals and reference signal. In some cases: (a) before the data is stored in the electronic memory device, a computer performs an algorithm to calculate the modulation signals and the reference signal; and (b) the algorithm includes calculating a best linear unbiased estimator that solves Equation 12. In some cases: (a) before the data is stored in the electronic memory device, a computer performs an algorithm to calculate the modulation signals and the reference signal; and (b) the algorithm includes performing semidefinite optimization to solve Equation 20. In some cases: (a) before the data is stored in the electronic memory device, a computer performs an algorithm to calculate the modulation signals and the reference signal; and (b) the algorithm includes performing non-negative matrix factorization to solve Equation 22. In some cases, the camera comprises a lock-in time of flight camera. In some cases: (a) the modulation signals are periodic; and (b) multiple periods of each of the modulation signals occur during each raw frame of the camera. Each of the cases described above in this paragraph is an example of the method described in the first sentence of this paragraph, and is also an example of an embodiment of this invention that may be combined with other embodiments of this invention.

In another aspect, this invention is a system comprising, in combination: (a) a set of multiple light sources for illuminating a scene; (b) a signal generator programmed to generate a reference signal and a set of multiple modulation signals, such that (i) the modulation signals control amplitude of light emitted by the light sources, causing the amplitude of light emitted by each light source to vary over time while the light sources illuminate the scene; (ii) the modulation signal for each light source is different than the modulation signal for the other light sources, and (iii) the modulation signals overlap in time and cause two or more of the light sources to simultaneously emit light during multiple time intervals of the modulation signals; (c) a camera configured to output, for each pixel of the camera, data indicative of a cross-correlation of (i) the reference signal and (ii) light reflected from the scene and incident on the pixel; and (d) a computer programmed to take the data as an input and to estimate, for each pixel of the camera: (i) an intensity for each respective light source, which intensity for each respective light source is equal to intensity of light that (A) is emitted by the respective light source and not by other light sources, (B) then reflects from the scene and (C) then travels to the pixel; and (ii) depth of a point in the scene that reflects light to the pixel. In some cases, each of the modulation signals is periodic and has a period that is shorter than the duration of a raw frame of the camera. In some cases, the camera comprises a lock-in time of flight camera. In some cases, the modulation signals are orthogonal to each other. In some cases: (a) the camera has a sampling rate, which sampling rate is equal to the number of raw frames of the camera per second; and (b) the reference signal is broadband with respect to the sampling rate. In some cases: (a) the camera has a sampling rate, which sampling rate is equal to the number of raw frames of the camera per second; and (b) the modulation signals are orthogonal to each other and the reference signal is broadband with respect to the sampling rate. In some cases, the system includes an electronic storage device, which storage device stores data indicative of the modulation signals and reference signals. In some cases, the modulation signals and reference signals are optimal signals according to Equation 20. In some cases, the modulation signals and reference signals are optimal signals according to Equation 23. Each of the cases described above in this paragraph is an example of the system described in the first sentence of this paragraph, and is also an example of an embodiment of this invention that may be combined with other embodiments of this invention.

In another aspect, this invention is a system comprising, in combination: (a) a set of multiple light sources; (b) a signal generator; (c) a lock-in time of flight camera; (d) a computer; and (e) one or more non-transitory, machine-readable media with instructions encoded thereon (i) for the signal generator to generate a reference signal and a set of multiple modulation signals, such that (A) the modulation signals control amplitude of light emitted by the light sources, causing the amplitude of light emitted by each light source to vary over time while the light sources illuminate a scene, (B) the modulation signal for each light source is different than the modulation signal for the other light sources, and (C) the modulation signals overlap in time and cause two or more of the light sources to simultaneously emit light during multiple time intervals of the modulation signals; and (ii) for the computer to take data gathered by the camera as an input and to calculate, for each pixel of the camera (A) an intensity for each respective light source, out of the set of light sources, which intensity is intensity of light that (I) is emitted by the respective light source and not by other light sources, (II) then reflects from the scene and (III) then travels to the pixel, and (B) depth of a point in the scene thareflects light to the pixel. Each of the cases described above in this paragraph is an example of the system described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the abovementioned implementations, embodiments and features.

What is claimed is:

1. A method comprising, in combination:
   (a) a set of multiple light sources illuminating a scene;
   (b) a signal generator generating a reference signal and a set of multiple modulation signals, such that, while the light sources illuminate the scene
      (i) the modulation signals control amplitude of light emitted by the light sources, causing the amplitude of light emitted by each light source to vary over time,
      (ii) the modulation signal for each light source is different than the modulation signal for the other light sources, and
      (iii) the modulation signals overlap in time and cause two or more of the light sources to simultaneously emit light during multiple time intervals of the modulation signals;
   (c) each pixel in the camera
      (i) measuring an incident intensity, which incident intensity is intensity of light that reflects from the scene and is incident on the pixel, and
      (ii) outputting data indicative of a cross-correlation of the incident intensity and the reference signal; and
   (d) a computer taking the data as an input and estimating, for each pixel of the camera
      (i) a separate intensity for each respective light source, out of the set of light sources, which separate intensity is intensity of light that (A) is emitted by the respective light source and not by other light sources, (B) then reflects from the scene and (C) then travels to the pixel, and
      (ii) depth of a point in the scene that reflects light to the pixel.

2. The method of claim 1, wherein the modulation signals are orthogonal to each other.

3. The method of claim 1, wherein:
   (a) the camera has a sampling rate, which sampling rate is equal to the number of raw frames of the camera per second; and
   (b) the reference signal is broadband with respect to the sampling rate.

4. The method of claim 1, wherein:
   (a) the camera has a rate sampling rate, which sampling rate is equal to the number of raw frames of the camera per second; and
   (b) the modulation signals are orthogonal to each other and the reference signal is broadband with respect to the sampling rate.

5. The method of claim 1, wherein the camera comprises a lock-in time of flight camera.

6. The method of claim 1, wherein:
   (a) the modulation signals are periodic; and
   (b) multiple periods of each of the modulation signals occur during each of the camera.

7. The method of claim 1, wherein data indicative of the modulation signals and reference signal:
   (a) is stored in an electronic memory device; and
   (b) is read from the memory device and is used by a signal generator that generates the modulation signals and reference signal.

8. The method of claim 7, wherein:
   (a) before the data is stored in the electronic memory device, a computer performs an algorithm to calculate the modulation signals and the reference signal; and
   (b) the algorithm includes calculating a best linear unbiased estimator that solves $$\hat{x}_{BLUE} = (L^T T^T \Sigma^{-1} TL)^{-1} L^T T^T \Sigma^{-1} c_\omega$$

where (i) $c_\omega = TLx + \eta$ and $c_\omega \in \mathbb{R}^{m \times 1}$ (ii) $T \in \mathbb{R}^{m \times pm}$ is a matrix formed from a p length reference code, (iii) $L \in \mathbb{R}^{p \times n}$ is an optical signal that comprises n column vectors $\xi_{\omega,1}, \ldots, \xi_{\omega,n}$, (iv) environmental vectors $\xi_{\omega,1}, \ldots, \xi_{\omega,n}$ correspond to light reflecting from n different light sources, (v) x∈ℝ$^{m×1}$, (vi) m is a number of samples taken, (vii) positive semidefinite matrix Σ is a covariance matrix of noise, and (viii) η is an additive noise vector with zero mean and variance σ$^2$.

9. The method of claim 7, wherein:
(a) before the data is stored in the electronic memory device, a computer performs an algorithm to calculate the modulation signals and the reference signal; and
(b) the algorithm includes performing semidefinite optimization to solve $$M^* = \underset{Q}{\operatorname{argmin}} tr(Q) \ s.t$$

$$1 \succeq vec(M) \succeq 0, Q \succeq \left(M^T \sum\nolimits^{-1} M\right)^{-1}$$

where (i) Q is an auxilary variable; (ii) Q−(M$^T$Σ$^{-1}$M)$^{-1}$ is a positive semidefinite matrix; (iii) noise matrix Σ=diag (σ$_1^2$, . . . , σ$_m^2$), (iv) σ$_1^2$, . . . , σ$_m^2$ are noise sources, (v) M=TL, (vi) T∈ℝ$^{m×pm}$ is a matrix formed from a p length reference code, (vii) L∈ℝ$^{p×n}$ is an optical signal that comprises n column vectors $\xi_{\omega,1}$, . . . , $\xi_{\omega,n}$, (viii) environmental vectors $\xi_{\omega,1}$, . . . , $\xi_{\omega,n}$ correspond to light reflecting from n different light sources, (ix) m is a number of samples taken, (x) tr is a trace operator, and (xi) ⪰ denotes a component-wise inequality for vectors and linear matrix inequalities for matrices.

10. The method of claim 7, wherein:
(a) before the data is stored in the electronic memory device, a computer performs an algorithm to calculate the modulation signals and the reference signal; and
(b) the algorithm includes performing non-negative matrix factorization to solve $$\{T^*, L^*\} = \underset{T,L}{\operatorname{argmin}} \|M^* - TL\|_F \ s.t$$

$$1 \succeq vec(T) \succeq 0, 1 \succeq vec(L) \succeq 0, T \in C$$

where (i) M★=T★L★ (ii) T★ is a circulant Toeplitz matrix, (iii) values of T★ and L★ are constrained between 0 and 1, (iv) set C ⊂ ℝ$^{m×p}$ is a subspace of Toeplitz circulant matrices, (v) ‖•‖$_F$ is a Froebius norm, and (vi) ⪰ denotes a component-wise inequality for vectors and linear matrix inequalities for matrices.

11. A system comprising, in combination:
(a) a set of multiple light sources for illuminating a scene;
(b) a signal generator programmed to generate a reference signal and a set of multiple modulation signals, such that
  (i) the modulation signals control amplitude of light emitted by the light sources, causing the amplitude of light emitted by each light source to vary over time while the light sources illuminate the scene,
  (ii) the modulation signal for each light source is different than the modulation signal for the other light sources, and
  (iii) the modulation signals overlap in time and cause two or more of the light sources to simultaneously emit light during multiple time intervals of the modulation signals;
(c) a camera configured to output, for each pixel of the camera, data indicative of a cross-correlation of (i) the reference signal and (ii) light reflected from the scene and incident on the pixel; and
(d) a computer programmed to take the data as an input and to estimate, for each pixel of the camera
  (i) an intensity for each respective light source, which intensity for each respective light source is equal to intensity of light that (A) is emitted by the respective light source and not by other light sources, (B) then reflects from the scene and (C) then travels to the pixel, and
  (ii) depth of a point in the scene that reflects light to the pixel.

12. The system of claim 11, wherein each of the modulation signals is periodic and has a period that is shorter than the duration of a of the camera.

13. The system of claim 11, wherein the camera comprises a lock-in time of flight camera.

14. The system of claim 11, wherein the modulation signals are orthogonal to each other.

15. The system of claim 11, wherein:
(a) the camera has a sampling rate, which sampling rate is equal to the number of raw frames of the camera per second; and
(b) the reference signal is broadband with respect to the sampling rate.

16. The system of claim 11, wherein:
(a) the camera has a sampling rate, which sampling rate is equal to the number of raw frames of the camera per second; and
(b) the modulation signals are orthogonal to each other and the reference signal is broadband with respect to the sampling rate.

17. The system of claim 11, wherein the system includes an electronic storage device, which storage device stores data indicative of the modulation signals and reference signals.

18. The system of claim 11, wherein the modulation signals and reference signals are optimal signals according to $$M^* = \underset{Q}{\operatorname{argmin}} tr(Q) \ s.t$$

$$1 \succeq vec(M) \succeq 0, Q \succeq \left(M^T \sum\nolimits^{-1} M\right)^{-1}$$

where (i) Q is an auxilary variable; (ii) Q−(M$^T$Σ$^{-1}$M)$^{-1}$ is a positive semidefinite matrix; (iii) noise matrix Σ=diag (σ$_1^2$, . . . , σ$_m^2$), (iv) σ$_1^2$, . . . , σ$_m^2$ are noise sources, (v) M=TL, (vi) T∈ℝ$^{m×pm}$ is a matrix formed from a p length reference code, (vii) L∈ℝ$^{p×n}$ is an optical signal that comprises n column vectors $\xi_{\omega,1}$, . . . , $\xi_{\omega,n}$, (viii) environmental vectors $\xi_{\omega,1}$, . . . , $\xi_{\omega,n}$ correspond to light reflecting from n different light sources, (ix) m is a number of samples taken, (x) tr is a trace operator, and (xi) ⪰ denotes a component-wise inequality for vectors and linear matrix inequalities for matrices.

19. The system of claim 11, wherein the modulation signals and reference signals are optimal signals according to $$\underset{C \in C}{\arg\min} \|T^{(k)} - C\|_F$$

where (i) $T^{(k)}$ is a $k^{th}$ iterative update, (ii) set $C \subset \mathbb{R}^{m \times p}$ is a subspace of Toeplitz circulant matrices, (iii) $\|\cdot\|_F$ is a Froebius norm, (iv) p is a length of reference code, and (v) m is the number of samples taken.

20. A system comprising, in combination:
    (a) a set of multiple light sources;
    (b) a signal generator;
    (c) a lock-in time of flight camera;
    (d) a computer; and
    (e) one or more non-transitory, machine-readable media with instructions encoded thereon
        (i) for the signal generator to generate a reference signal and a set of multiple modulation signals, such that
            (A) the modulation signals control amplitude of light emitted by the light sources, causing the amplitude of light emitted by each light source to vary over time while the light sources illuminate a scene,
            (B) the modulation signal for each light source is different than the modulation signal for the other light sources, and
            (C) the modulation signals overlap in time and cause two or more of the light sources to simultaneously emit light during multiple time intervals of the modulation signals, and
        (ii) for the computer to take data gathered by the camera as an input and to calculate, for each pixel of the camera
            (A) an intensity for each respective light source, out of the set of light sources, which intensity is intensity of light that (I) is emitted by the respective light source and not by other light sources, (II) then reflects from the scene and (III) then travels to the pixel, and
            (B) depth of a point in the scene that reflects light to the pixel.

\* \* \* \* \*